United States Patent Office 3,010,816
Patented Nov. 28, 1961

3,010,816
METHOD FOR PREVENTING DAMPING-OFF OF PLANTS
Charles W. Osborn and Dean J. Veal, Bartlesville, Okla., assignors to Phillips Petroleum Company, a corporation of Delaware
No Drawing. Filed Dec. 11, 1958, Ser. No. 779,570
6 Claims. (Cl. 71—3)

This invention relates to improvements in the growing of plants from seeds. In one aspect, this invention relates to methods for preventing the damping-off of seedling plants. In another aspect, this invention relates to anti-damping-off compositions for preventing the damping-off of plant seedlings. In another aspect, this invention relates to soil compositions inhibited against damp-off.

The problem of damping-off of seedling plants is very serious in some areas under some conditions and has caused major agricultural losses in the growing of cotton, tobacco, bananas and other plants. Damping-off is caused by plant diseases which are closely related to certain root rot diseases and is characterized by the breaking off of the young seedling sprouts at or slightly above ground level. Damping-off occurs quite extensively in greenhouses where high humidity and relatively high temperatures usually prevail.

Although many compounds are useful in preventing the damping-off of seedling plants, most of these treating agents are organo-mercury compounds which exhibit high toxicity to humans and animals making them extremely dangerous to handle under field conditions. Also, these materials are very expensive to manufacture. Other compounds, which are not so dangerous to handle, sometimes have adverse effects on the plants even though damping-off is prevented.

We have now discovered that morpholinium-1-morpholinecarbodithioate is effective in combating the damping-off of seedling plants.

An object of this invention is to provide methods for preventing the damping-off of seedling plants.

Another object of this invention is to provide anti-damping-off compositions for preventing the damping-off of seedling plants.

Another object of this invention is to provide anti-damping-off compositions which do not exhibit high toxicity to either humans or plants.

Another object of this invention is to provide soil compositions inhibited against damp-off.

Another object of this invention is to provide fertilizer compositions for combating damp-off of seedling plants.

Other aspects, objects and the several advantages of the invention are apparent from a study of this disclosure and the appended claims.

In accordance with the invention, anti-damping-off agents have been provided containing, as an essential active ingredient, morpholinium-1-morpholinecarbodithioate.

In accordance with another concept of the invention, there is provided a method for preventing damping-off of seedling plans by applying morpholinium-1-morpholinecarbodithioate to the situs of the seeds of said plant.

In accordance with another concept of this invention, there is provided soil compositions which inhibit damping-off of plants and which contain morpholinium-1-morpholinecarbodithioate.

In accordance with another concept of this invention, there is provided a fertilizer composition which prevents the damping-off of plants and which contains morpholinium-1-morpholinecarbodithioate.

The anti-damping-off agent of this invention is applied to the situs of the seeds. Thus, the anti-damping-off agent can be applied to seeds before planting, to the soil in which the seeds are to be planted, or to the soil in which the seeds have already been planted. If the anti-damping-off agent is to be applied to the soil in which the seeds have already been planted, the material should be applied before the tips of the seedlings appear at the surface of the soil. The application of the anti-damping-off agent of this invention is made in an amount sufficient to supply from 1 to 50 pounds per acre; however, larger or smaller amounts can be applied, as desired, although it is generally neither economical to apply larger amounts or too efficient to employ smaller amounts. When the material is applied directly to the seeds before planting, much smaller amounts can be employed. The anti-damping-off agent of this invention can be applied in the form of either a solution or a dust. Preferably, the material is applied as a water solution since this is the most economical method of application. When applying the anti-damping-off agent of this invention as a solution, the composition will contain from 0.01 to 5 percent of the effective ingredient with the remainder of the composition being the diluent. A preferred liquid composition comprises from 0.05 to 2 percent by weight of the effective ingredient with the remainder as diluent. Besides water, xylene, acetone and the like, can also be used as diluents, particularly in admixture with an emulsifying agent.

The anti-damping-off agent of this invention can be utilized for its intended purpose in the solid state as a dust, preferably in admixture with a solid diluent substantially inert to the active ingredient. Solid inert carriers, especially suitable, include kieselguhr and vermiculite, and other inert finely divided solid materials. A particularly effective composition in powdered form contains a solid fertilizer, such as ammonium nitrate, potash, or mixed fertilizers, as the inert ingredient. A particularly useful mixed fertilizer is identified as "5–10–5" containing 5 percent nitrogen, 10 percent phosphorus as $P_2O_5$, and 5 percent potassium as $K_2O$. When applied in powdered form, the composition should contain from 1 to 50 by weight of the effective ingredient with the remainder of the composition comprising the inert material, including the fertilizer.

The anti-damping-off agent of this invention can be readily prepared by the reaction of 2 mols of morpholine with 1 mol of carbon disulfide in the presence of a diluent to attain a high yield of morpholinium-1-morpholinecarbodithioate, as disclosed in U.S. Patent 2,563,007 of W. W. Crouch.

The following examples illustrate the effectiveness of the anti-damping-off agent of this invention; however, it is not intended that the invention be limited to the specific embodiments shown in these examples.

EXAMPLE I

Morpholinium-1-morpholinecarbodithioate was tested in a hot-house as an anti-damping-off agent for young cucumber plants. The material was applied as either a water solution or a dust to the surface of soil in 6-inch clay flowers pots in which cucumber, bean, morning glory and radish seeds, 50 of each, had recently been planted. The effectiveness of the morpholinium-1-morpholinecarbodithioate as anti-damping-off agent was compared to a commercially available anti-damping-off agent comprising a solution containing 0.6 weight percent cyano(methylmercuri)guanidine as the effective ingredient. Controlled runs were also carried out in which no anti-damping-off agents were applied. The seedlings were examined for damp-off three days after treatment with the respective materials. The results of these tests are expressed below in Table I.

*Table 1*

| Anti-damping-off agent used | Milligrams of agent per pot | Method of application | Number of pots treated | Number of pots Exhibiting damp-off | Number of pots with no damp-off | Total plants damped-off | Number of pots in which mature plants resulted |
|---|---|---|---|---|---|---|---|
| Morpholinium-1-morpholinecarbodithioate. | 100 | Solution [1] | 5 | 3 | 2 | 3 cucumbers only | 4 |
| Do | 150 | do [1] | 5 | 2 | 3 | 2 cucumbers only | 4 |
| Do | 150 | Dust on soil | 5 | 3 | 2 | 3 cucumbers only | 5 |
| None | 0 | | 5 | 5 | 0 | 5 cucumbers, 2 beans, 5 morning glories and 4 radishes. | 2 |
| Commercial | 100 | Solution [1] | 5 | 5 | 0 | 5 cucumbers, 4 morning glories and 5 radishes. | 1 |

[1] Solution applied by pooring the desired amount of chemical dissolved in 100 cc. water into each 6-inch pot.

The tests as described above were carried out under hot-house conditions which appeared to be ideal for the damping-off of plants. Thus, the tests for determining the effectiveness of the anti-damping-off agent of this invention were very stringent.

The above test demonstrates that morpholinium-1-morpholinecarbodithioate is an effective anti-damping-off agent and is more effective than a commercial agent sold for this purpose.

Reasonable variation and modification are possible within the scope of the foregoing disclosure and the appended claims to the invention, the essence of which is that there have been provided: (1) a method for preventing the damping-off of seedling plants by applying morpholinium-1-morpholinecarbodithioate to the situs of the seeds of the plant; (2) compositions containing morpholinium-1-morpholinecarbodithioate as an effective active ingredient; (3) compositions of matter comprising soil containing morpholinium-1-morpholinecarbodithioate as an anti-damping-off agent; and (4) compositions of matter comprising fertilizer containing morpholinium-1-morpholinecarbodithioate as an anti-damping-off agent.

We claim:

1. In the method of preventing damping-off of seedling plants by damping-off fungi, the improvement which comprises subjecting the fungi to action of morpholinium-1-morpholinecarbodithioate to substantially reduce attack of said plants by damping-off fungi.

2. The method of claim 1 wherein said morpholinium-1-morpholinecarbodithioate is applied to the soil before the seeds are placed therein.

3. The method of claim 1 wherein said morpholinium-1-morpholinecarbodithioate is applied to the soil after seeds have been placed therein.

4. The method of claim 1 wherein seeds are contacted with said morpholinium-1-morpholinecarbodithioate before being placed in said soil.

5. The method of claim 1 wherein said morpholinium-1-morpholinecarbodithioate is applied to the soil in admixture with a fertilizer.

6. The method of claim 1 wherein said morpholinium-1-morpholinecarbodithioate is applied to the situs of the seeds in proportions in the range of from 1 to 50 pounds per acre.

References Cited in the file of this patent

UNITED STATES PATENTS

| | | |
|---|---|---|
| 1,573,490 | Hand | Feb. 16, 1926 |
| 2,222,734 | Bancroft et al. | Nov. 26, 1940 |
| 2,222,738 | Bancroft et al. | Nov. 26, 1940 |
| 2,269,893 | Carter | Jan. 13, 1942 |
| 2,317,765 | Hester | Apr. 27, 1943 |
| 2,325,720 | Urbschat et al. | Aug. 3, 1943 |
| 2,354,940 | Carter et al. | Aug. 1, 1944 |
| 2,838,389 | Yoder | June 10, 1958 |
| 2,919,182 | Harman et al. | Dec. 29, 1959 |

OTHER REFERENCES

Frear: "Chemistry of the Pesticides," D. Van Nostrand Co., Inc., New York, 3rd ed., 1955, pages 294–296.